No. 842,798. PATENTED JAN. 29, 1907.
H. J. MONDOR.
TIRE.
APPLICATION FILED FEB. 7, 1906.
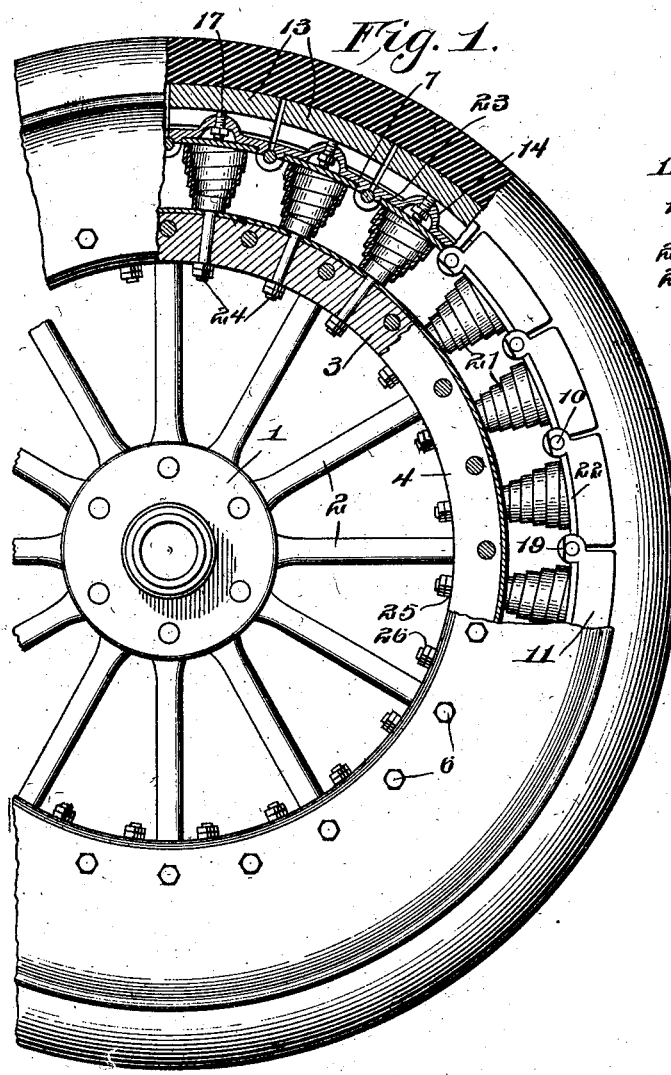
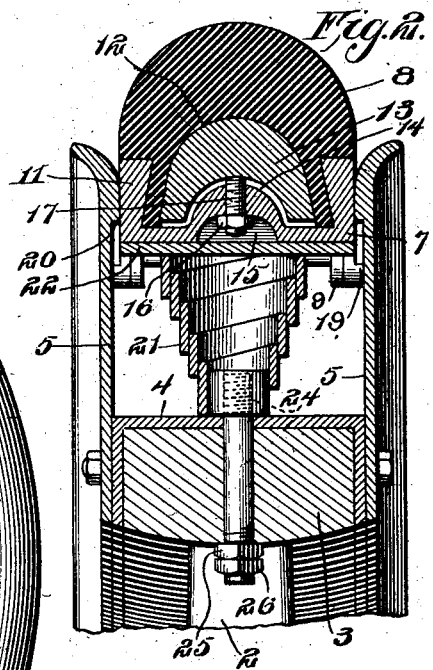
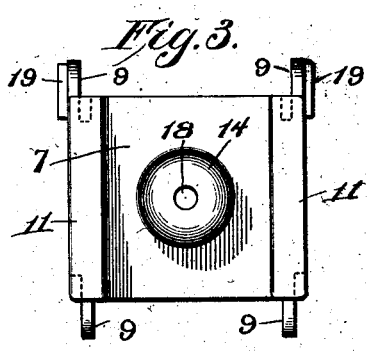
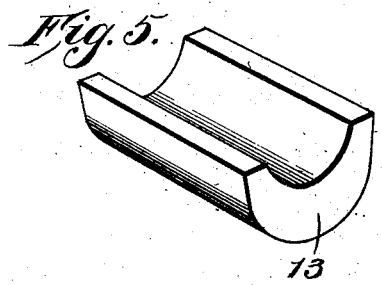
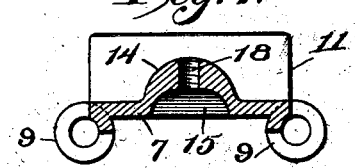
WITNESSES:
INVENTOR
*Hector J. Mondor*
BY *Victor J. Evans*
Attorney.

UNITED STATES PATENT OFFICE.

HECTOR J. MONDOR, OF HOLYOKE, MASSACHUSETTS.

TIRE.

No. 842,798. Specification of Letters Patent. Patented Jan. 29, 1907.

Application filed February 7, 1906. Serial No. 299,998.

*To all whom it may concern:*

Be it known that I, HECTOR J. MONDOR, a citizen of the United States, residing at Holyoke, in the county of Hampden and State of Massachusetts, have invented new and useful Improvements in Tires, of which the following is a specification.

This invention relates to vehicle-wheels, and has for its object to provide a spring-wheel especially adapted for rubber-tired vehicles, such as automobiles, the aim of the invention being to impart resiliency to the tread of the wheel without resort to a pneumatic tire and the objections incident to the use thereof, such as puncturing and the like.

The wheel hereinafter described combines the necessary resiliency or spring action with durability, simplicity, and economy of manufacture and also perfect accessibility, so that all parts of the wheel may be reached quickly and removed, repaired, and replaced.

With the above and other objects in view the invention consists in the novel construction, combination, and arrangement of parts hereinafter more fully described, illustrated, and claimed.

In the accompanying drawings, Figure 1 is a sectional side elevation of a wheel embodying the present invention. Fig. 2 is an enlarged cross-sectional view of the same. Fig. 3 is a plan view of one of the outer rim-sections or links looking toward the outer face thereof. Fig. 4 is a section through one of the rim-sections or links, taken lengthwise of the rim. Fig. 5 is a detail perspective view of one of the tire-retaining wedges.

Referring to Fig. 1, I have therein illustrated a vehicle-wheel embodying a head 1, spokes 2, and a main rim 3, which I will hereinafter term the "inner" rim. This rim is ordinarily formed of wood, and in order to protect the same from undue wear caused by the operative parts of the tire and rim hereinafter described said wooden rim is provided with a metal sheath or cover 4, extending around three sides thereof, as shown in Figs. 1 and 2.

Arranged on opposite sides of the inner rim 3 and the sheath 4 thereof and extending outward therefrom are side rim-plates 5, between which the resilient portion of the tire, including the outer rim, moves as it is pressed inward by the weight imposed on the wheel and moved outward by the means hereinafter described. The side plates are bolted or otherwise secured to the inner rim 4 by means of bolts or other suitable fastenings 6.

The rim 7, which receives and holds the tire 8, is composed of a large number of sections or links, one of which is shown in Figs. 3 and 4, the same being substantially square or rectangular in plan view and provided at opposite ends with oppositely-projecting ears 9, adapted to receive pivots or pins 10, by means of which all of the links or sections are hingedly connected together in the manner illustrated in Fig. 1.

Each rim-section 7 is provided with outwardly-extending tire-retaining flanges 11 at opposite sides thereof, the same being undercut or slanted in opposite directions upon their inner adjacent faces, as shown in Fig. 2. The tire 8 is preferably formed of rubber solid in cross-section and having its inner side cut out in semicylindrical form, as shown at 12, to receive a wedge 13, one of such wedges being used for each rim-section or link. The opposite side faces of the wedge 13, converge outwardly, and as said wedge is thrust outward it confines oppositely-lying portions of the tire between itself and the reversely-slanting inner faces of the flanges 11, the tire being thus wedged within the rim-sections in the manner clearly shown in Fig. 2. In order to accomplish this wedging action, the central portion of each section or link 7 is pressed outwardly, as shown at 14, thereby forming a recess 15 in the inner face of the link or section adapted to receive and house a nut 16 and also the inner end of a wedge-forcing screw 17, which is threaded through an opening 18 in the offset portion of the link or section and bears at its outer end against the wedge 12 for forcing said wedge outward and binding the tire in the rim-section. It will be understood that the clamping means just hereinabove described is used in connection with each rim-section or link. Each section or link 7 is further provided with laterally-projecting stop-shoulders 19, and the inner faces of the side rim-plates 5 are provided with corresponding stop-shoulders 20, with which the shoulders 19 come in contact to prevent the outward displacement of the tire or the rolling of the tire out of the rim in turning corners suddenly and throwing excessive lateral strain on the tire.

Between the outer and inner rims is interposed a series of helical springs 21, having their larger ends disposed outwardly and their inner ends bearing against the sheath 4 of the inner rim. One of said springs is used for each rim-section or link 7, and the outer end of said spring carries a permanently-attached or integral spring-plate 22, having its opposite edges dovetailed, so that it may be slid laterally into a corresponding recess 23 in the inner side of its respective rim-section or link 7, as shown in Figs. 1 and 2. The inner end of the spring is secured to the rim 3 by means of a stud-bolt 24, which is carried by and connected to the spring and passed through a radial opening in the rim 3, within which it receives a retaining-nut 25 and, if desired, a lock-nut 26.

As may be readily seen from the construction described, the weight of the vehicle and its load is carried on the springs in two ways—that is to say, the springs below the center of the wheel act under compression and those above the center under tension. The outer rim being made up of flexible sections is free to assume the proper shape to cause an even distribution of the load on the majority of the springs, thus providing an even-running resilient wheel.

To repair the wheel, it is only necessary to remove one of the side rim-plates, when all parts are exposed for inspection. By taking out one of the stud-bolts through the inner rim any desired spring may be removed, and replaced by another. All of the springs may be thus successively removed, or the outer rim and tire, as a whole, may be slid laterally out of engagement with the springs and replaced in the same manner with ease and despatch.

I claim—

1. A wheel embodying an inner rim, an outer rim composed of hinged sections, a tire fitted to the outer rim, and springs interposed between the outer and inner rims and adapted to be slid laterally out of engagement with the sections of the outer rim.

2. A wheel comprising an inner rim, an outer sectional and flexible rim, a tire carried by the outer rim, and springs interposed between the outer and inner rims, each spring carrying a stud-bolt at one end removably fitted to one rim and carrying a plate at its opposite end having an interlocked but detachable engagement with the other rim.

3. A vehicle-wheel comprising an inner rim, an outer rim made up of hinged sections, springs interposed between the inner rim and the sections of the outer rim, undercut flanges extending outward from each outer rim-section, a recessed offset located centrally of each outer rim-section, a tire-retaining wedge fitting over such offset portion, and a wedge-forcing screw passing through said offset portion and bearing against the wedge for causing the latter to clamp the tire between the flanges of each outer rim-section.

4. A vehicle-wheel comprising an inner rim, an outer flexible rim composed of hinged sections having dovetailed recesses in their inner faces, and springs interposed between the inner and outer rims, each of said springs being provided at its outer end with a plate having beveled edges adapted to fit slidingly into the dovetailed recess in the inner face of the corresponding outer rim-section.

In testimony whereof I affix my signature in presence of two witnesses.

HECTOR J. MONDOR.

Witnesses:
JOSEPH C. DRAPEAU,
ROBERT CADDRO.